United States Patent [19]
Dessert

[11] 3,851,378

[45] Dec. 3, 1974

[54] METHOD OF CONSTRUCTING CABLE TRAY

[75] Inventor: Jean Marcel Dessert, Calgary, Alberta, Canada

[73] Assignee: Renn-Cupit Industries Ltd., Alberta, Canada

[22] Filed: Nov. 2, 1972

[21] Appl. No.: 303,038

[30] Foreign Application Priority Data
Aug. 29, 1972 Canada ............................... 150503

[52] U.S. Cl. ...................... 29/523, 182/228, 248/49
[51] Int. Cl. ...................... B21d 39/00, B23p 11/02
[58] Field of Search ...... 29/523, 522; 182/194, 228; 248/49

[56] References Cited
UNITED STATES PATENTS

| | | |
|---|---|---|
| 2,215,882 | 9/1940 | Maloney ............................. 221/6 L |
| 2,815,255 | 12/1957 | Phillips et al. ........................ 309/14 |
| 3,119,435 | 1/1964 | Greenman ....................... 29/523 X |
| 3,349,870 | 10/1967 | Lieblein ............................. 182/228 |
| 3,563,882 | 2/1971 | Kimura et al. .................... 248/049 |
| 3,598,349 | 8/1971 | Drake ................................. 248/49 |
| 3,670,405 | 6/1972 | Dochterman ................... 29/523 X |

*Primary Examiner*—C. W. Lanham
*Assistant Examiner*—Victor A. DiPalma

[57] ABSTRACT

The disclosure relates to cable trays of the type where a pair of parallel side rails are joined in ladder-like fashion by a plurality of rung-like cross-members. The method of making the cable tray according to the present disclosure includes passing the cross-members through opposed holes provided in the side rails and cold forming positions of the cross-members to provide a pair of spaced peripheral flanges towards each end thereof in clamping engagement with opposite faces of each side rail.

6 Claims, 12 Drawing Figures

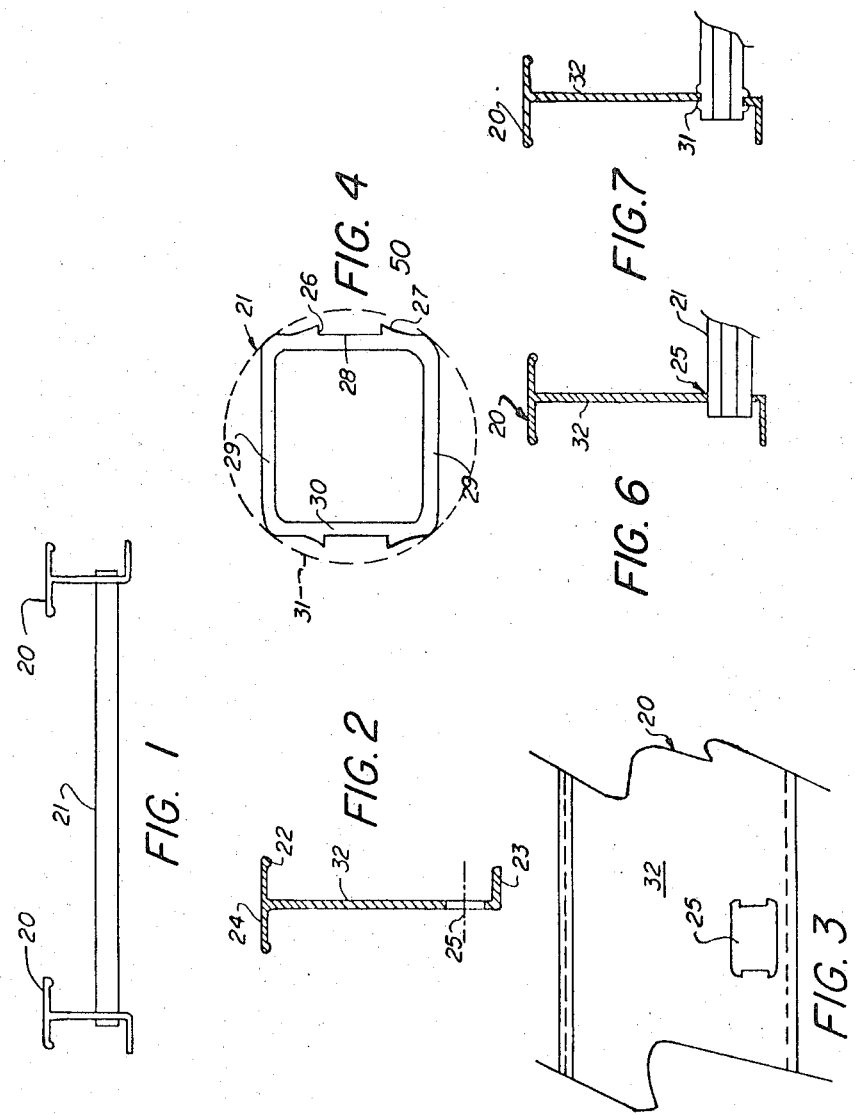

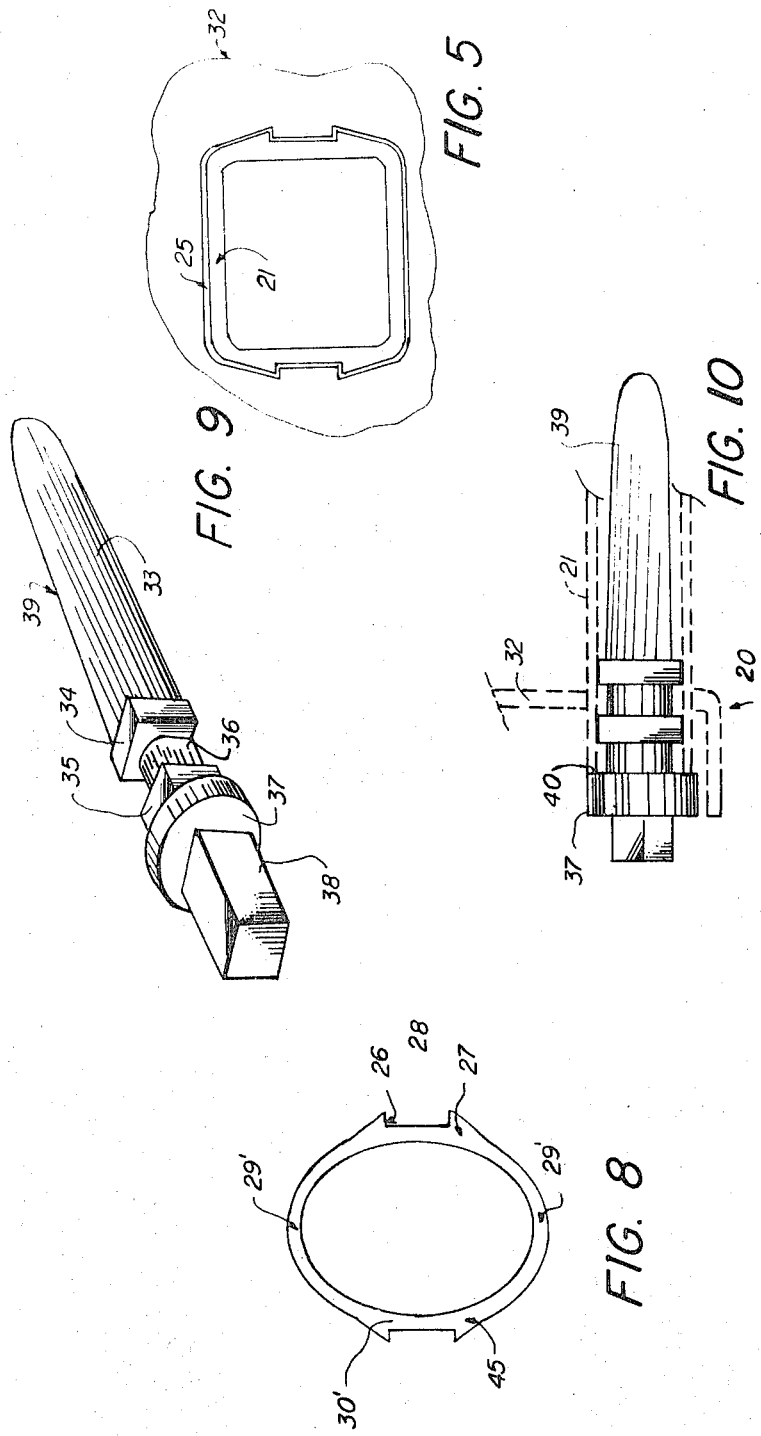

METHOD OF CONSTRUCTING CABLE TRAY

BACKGROUND OF THE INVENTION

1. Field of Invention

This invention relates to cable trays of the type comprising a pair of parallel side rails joined in ladder-like fashion by a plurality of rung-like cross members and particularly to a method and means of making such trays and the configuration thereof.

2. Description of the Prior Art

In the production of cable trays, the electrical conductivity between assembled components is important, as is the torsional rigidity of the completed structure.

Prior methods of producing such trays are known, which methods involve the attachment of the cross members to the two parallel side sections by welding, swaging, or by the introduction of a third component, for example, a spacer which is either crimped or pressure formed to effect the connection between the side sections and the cross members. The thermal connections produced by welding create a problem of heat and distortion. In the event of improper cooling or improper welding, thermal cracks will occur in the welded material and these cracks will create an electrical conductivity barrier. Welding also creates local stress raisers in the form of notches or undercutting and these result in undesirable stress levels. In the second of the abovementioned methods, where a circular cross member is, for example, swaged to the side rail sections, a relatively high stress is evolved at the swaged area and should torsional forces be applied to the structure, a relative motion occurs between the cross member and the swaged joint. This movement causes an air gap to occur in the connection, which decreases the electrical conductivity between the members and at the same time causes a loss of torsional rigidity. In order to overcome this deficiency, the third mentioned method is utilized, and a third or intermediate sleeve section is introduced. This however involves the utilization of relatively complex equipment to effect a satisfactory connection, which consequently increases manufacturing costs.

The present invention seeks to overcome the above mentioned disadvantages by providing a relatively inexpensive method of producing cable trays which meets the required standards with regard to torsional rigidity and electrical conductivity.

SUMMARY OF THE INVENTION

Accordingly, the invention provides a method of making a cable tray by assembling a plurality of cross members of non-circular cross-section and of hollow construction, at least at their ends, transversely between spaced longitudinally extending side rails, said side rails being provided with a plurality of aligned openings, said method including passing said cross members through opposed openings in the side rails and cold forming portions of the cross members to provide a pair of spaced peripheral flanges at each end thereof in clamping engagement with opposite faces of a said side rail.

The invention also encompasses a cable tray comprising a plurality of cross members of non-circular cross-section and of hollow construction, at least at their ends, assembled transversely in spaced relation between spaced, longitudinally extending side rails. The cross members project through openings in the side rails and are rigidly attached thereto by a pair of spaced arcuately extending flanges which tightly engage opposite faces of the side rails. The openings provided in the side members are non-circular and the resultant joint gives the structure increased torsional rigidity.

The tool, which is used to achieve the connection between the side rails and cross members has a pair of upsetting heads spaced longitudinally and separated by an intermediate portion of reduced cross-section. The heads are dimensioned so as to closely fit into the cross member and are spaced to permit positioning thereof adjacent the opposite faces of a side rail. Upon rotation of the tool, the heads cold-form areas of the cross member arcuately into gripping relation with the side rail. The upsetting heads, in effect, cause an arcuate expansion of the cross member to occur equally and at the same time at each of said opposite faces of the side rail.

BRIEF DESCRIPTION OF THE DRAWINGS

Certain embodiments of the invention will now be described, by way of example, reference being had to the accompanying drawings in which:

FIG. 1 is an end view of a cable tray at a first stage of assembly. depicting two side rail members and a cross member in position for connection thereto;

FIG. 2 is a cross-section of a representative configuration of a side rail showing the opening provided for the cross member;

FIG. 3 is a fragmentary side view of the side rail of FIG. 2 showing the shape of the opening therein;

FIG. 4 is an end view of a preferred form of cross member.

FIG. 5 (on sheet 2 of the drawings) is a detail showing the cross member inserted into the side rail prior to forming a joint therebetween.

FIG. 6 is a section showing the preferred form of cross member inserted into the side rail prior to forming a joint therebetween;

FIG. 7 is a similar section to FIG. 6 showing the completed connection;

FIG. 8 is an end view of an alternative form of the cross member having a non-circular cross-section and of hollow construction;

FIG. 9 is a perspective view of the tool used to carry out the forming operation with a cross member having a section as seen in FIG. 4;

FIG. 10 shows the tool positioned within the cross member prior to forming the joint.

DESCRIPTION OF THE PREFERRED EMBODIMENTS

Figure 11:
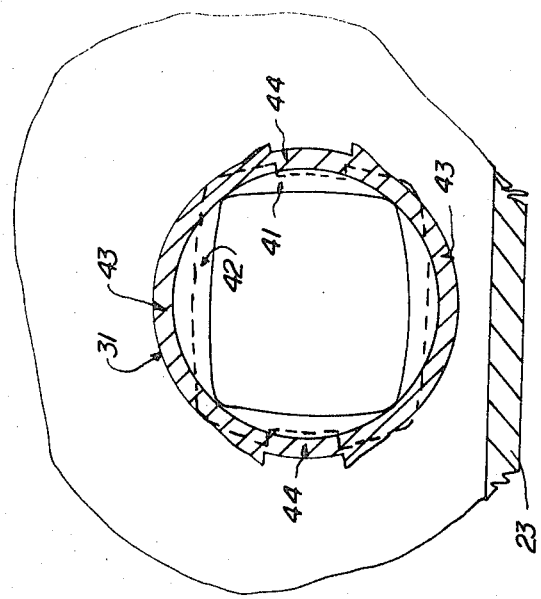
FIG. 11 is a section on VI-VI, FIG. 7 showing the completed connection.

Referring now to the drawings, in all of which like parts are designated by like reference numerals, FIG. 1 shows a pair of side rails 20 and a cross member 21. This figure represents an end view of the cable tray and it will be appreciated that the continuation in a longitudinal sense along the cable tray itself will constitute a ladder-like structure which will be of specific length and width dependent upon the design of tray being produced.

Looking now to FIG. 2, this represents in detail the typical side rail section 20 which has a configuration with an upper flange 24 having equal bulbous protrusions 22 at the extreme portions of the flange. Extending from the center of the flange in "T" form is a central web 32, the lower end of which is formed as flange half section 23. The opening 25, through which a square-sectioned cross member is ultimately inserted, is formed in the lower portion of web section 32.

From FIG. 3, it will be seen that the opening 25 in side rail 20, is formed identical in shape to the cross section of cross member 21 (FIG. 4).

In FIG. 4, the details of cross member 21 are illustrated to show more clearly the preferred configuration of this member. Essentially, the cross member 20 is a hollow structure with horizontally opposed members 29 and vertically opposed members 30 forming a continuous hollow section. The exterior side of vertical members 30 have channels having bottoms 28 and sides 26 created by tapered areas 27 terminating in sharp projecting edges 50, the entire cross-section being of a continuous nature as would be expected from an extrusion forming die.

FIG. 5 represent an end view showing the cross member 21 inserted into the opening 25 in sidewall 32.

FIG. 6 represents a cross-section of a side rail 20 with the cross member 21 inserted through opening 25. In the preferred embodiment of the invention the lower flange 23 always projects outwardly of the cable tray. This is clearly shown in FIGS. 1 and 5.

FIG. 7 represents the same conditions as detailed in FIG. 6 except that the cross member has now been arcuately expanded, the expansion being indicated by the raised section 31 formed on each side of web section 32 of the side rail member 20.

In FIG. 8, the details of cross member 45, an alternative form of cross member, is illustrated. In comparison to the cross member 21 of FIG. 4, cross member 45 is a hollow structure with approximately horizontally opposed members 29, and approximately vertically opposed member 30' forming a continuous non-circular hollow section. The exterior side of the vertical-like members 30' have channels as with cross member 21.

FIG. 9 shows the expansion tool used to make the connection between cross members 21 and the side rails 20. A guide nose 33 is tapered away from a raised square inner section 34 which is provided with rounded corners 46. Between inner square section 34 and an outer square section 35 also provided with rounded corners 46 is machined a circular recess 36. Adjacent the square section 35 there is a circular stop flange 37. At the end opposite the guide nose 33 is a chuck drive section 38, designed to accommodate a pneumatic, or equivalent type of drive.

FIG. 10 shows the tool 39 with the various parts thereof in proper position relative to cross member 21 and side rail member 20, (shown in phantom). In this figure, it is to be noted that the tool 39 is automatically positioned with respect to cross member 21, and the web 32 (shown in phantom) of side rail 20, by means of shoulder 40 between the outer square 35 and the stop flange 37.

FIG. 11 shows the cross member 21 after expansion by means of the tool shown in FIG. 9. The cross member 21 (shown in phantom) has been expanded into circular shape at raised portions 31 and it is to be noted that the vertical members 30 and horizontal members 29 (FIG. 4) in the area between sections 31 (FIG. 7) have been slightly expanded into vertically opposed members 41 and horizontally opposed members 42. The fully expanded horizontally opposed side walls 29 are now shown as curve sections 43 and the vertically opposed members 30 are now fully expanded and are shown as members 44. It will be appreciated that an assembly jig (not shown) is utilized to hold the cross member and side rails in position prior to forming the connection.

Figure 12:
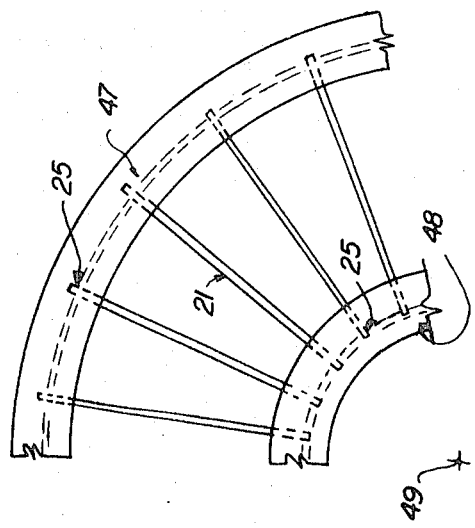
FIG. 12 shows a plan view of curved side rail sections connected in ladder-like construction by means of cross members.

FIG. 12 depicts the ladder-like structure of the invention in curved form, having curved outer rail 47 and a curved inner rail 48 both of which are identical in cross-section to the side rail member 20 shown in FIG. 1, and FIG. 2. It is to be noted that if the openings 25 in the webs of the curved side rail sections 47 and 48 are aligned to each other through the center of curvature 49.

In the preferred embodiment of the invention, two light alloy side rails 20 are provided (FIGS. 1 and 2) of modified "I," or "J," section. A number of non-circular square section cross members 21 FIG. 4) are also provded. These cross members are positioned to extend transversely of side rails 20 and protrude through square openings 25 provided in webs 32, thus forming a ladder-type of structure. The components are held in an assembly jig (not shown) and the forming tool (FIG. 10) is inserted into the end of cross member 21. When the components are correctly aligned the tool is rotated, causing the square section portions 34 and 35 to rotate in contact with the areas of the cross member immediately adjacent the sides of the web 32, thus expanding said areas arcuately into contact with web 32 to form a tight fitting joint. Also, the points 50 (FIG. 4) are driven into tight engagement with the corresponding parts of the opening 25 in web 32. The tool is then extracted and the operation repeated at each connection point, until the cable tray is complete.

It will be apparent that not only does the expansion of the cross member provide for a tight joint but the sharply defined protruding edges 50, bordering the channels in wall members 30, when formed in an arcuate manner, follow a curved path outwardly away from the centerline of the cross member and are driven into the material of the side rails surrounding the opening 25 so that the connection made between the cross member and the opening in the side rail is effectively keyed. This keying, created by the forming operation, provides a number of inherent advantages. The strength and rigidity of this connection provides a torsionally rigid structure in which the torsional shear forces are opposed by the keying connection. The use of a non-circular section provides a greater resistance to torsional deflection by providing a greater polar moment than if a symmetrical circular section were used. In addition, because no welded structure is used, the distortion due to heat and the possibility of thermal cracking that would cause a substantial reduction in the electrical conductivity path is eliminated.

The shape of the side rails, in particular the outstanding lower flanges, provides a ready and common clamping surface so that the entire cable tray structure can be attached to the ceilings or like structure of buildings. The preferred form of cross member, as shown in FIG.

4, makes it possible to utilize a clip-on type hanger bracket for clamping the cables, which eliminates the necessity for any bolts, nuts, washers, or other like fastening arrangements.

It will also be appreciated that the curved tray sections as depicted by FIG. 12 may be joined to the straight sections by conventional means, such as standard adapter plates, thus making it possible to provide a continuous cable tray which will accomodate any required changes in direction.

What I claim as my invention:

1. A method of making a cable tray by assembling a plurality of cross members, having non-circular cross-section and being of hollow construction at their end portions, transversely between spaced longitudinally extending side rails provided with a plurality of aligned longitudinally spaced openings, said method including passing said cross members through opposed aligned openings in said side rails, inserting a cold forming tool into each of said hollow end portions of each of said cross members and rotating said tool whereby two spaced, peripheral flanges are simultaneously formed at each end portion in clamping arrangement with and on opposed faces of said side rails.

2. The method of claim 1 wherein said side rails are formed of substantially "J" section and comprise an upper flange provided with bulbous protrusions at edges thereof, a downwardly extending central web, and a lower horizontally extending half flange.

3. The method of claim 2 wherein said openings are provided in said central web adjacent said half flange sections, said openings being substantially identical in shape to a said cross member.

4. The method of claim 3 wherein said side rails are spaced parallel to one another in back-to-back relation such that when said cross members are positioned in said openings, said half flange sections extend outwardly of the assembled structure.

5. The method of claim 1 wherein said cross members are extruded hollow structures having horizontal upper and lower wall sections and vertical wall sections interconnecting said upper and lower sections, said wall sections being provided on their outer faces with hanger bracket receiving channels which extend longitudinally of said members.

6. A method of making a cable tray by assembling a plurality of cross members, having non-circular cross-section and being of hollow construction at their end portions, transversely between spaced curved extending side rails, said side rails being provided with a plurality of spaced openings, aligned to the center of curvature of the curved extending side rails, said method including passing said cross members through the aligned and opposed openings in said curved side rails, inserting a cold forming tool into each said hollow end portion of each said cross member, and rotating said tool whereby two spaced, peripheral flanges are simultaneously formed at each end portion in clamping engagement with and on opposed faces of said side rail.

* * * * *